(12) United States Patent
Peterson et al.

(10) Patent No.: US 7,505,377 B1
(45) Date of Patent: Mar. 17, 2009

(54) DIGITAL COPY MACHINE

(75) Inventors: Keith R. Peterson, Burnsville, MN (US); David J. Logelin, Mound, MN (US)

(73) Assignee: Condre, Inc., Eden Prairie, MN (US)

( * ) Notice: Subject to any disclaimer, the term of this patent is extended or adjusted under 35 U.S.C. 154(b) by 672 days.

(21) Appl. No.: 11/179,880

(22) Filed: Jul. 12, 2005

(51) Int. Cl.
*G11B 7/085* (2006.01)
*G11B 17/04* (2006.01)

(52) U.S. Cl. .................. 369/30.34; 369/30.03; 710/110

(58) Field of Classification Search .............. 369/30.03, 369/30.34, 30.19, 30.36, 30.83, 30.85, 30.32, 369/30.33; 720/601; 710/110
See application file for complete search history.

(56) References Cited

U.S. PATENT DOCUMENTS

| | | | | |
|---|---|---|---|---|
| 5,784,581 A | * | 7/1998 | Hannah | 710/110 |
| 6,141,298 A | | 10/2000 | Miller | 369/30 |
| 6,298,017 B1 | * | 10/2001 | Kulakowski et al. | 369/36.01 |
| 6,327,230 B1 | | 12/2001 | Miller et al. | 369/34 |
| 6,490,232 B2 | * | 12/2002 | Sato | 369/30.34 |
| 6,722,240 B1 | * | 4/2004 | Weng | 83/167 |

* cited by examiner

*Primary Examiner*—Ali Neyzari
(74) *Attorney, Agent, or Firm*—Steven E. Kahm

(57) ABSTRACT

The digital copying machine has a printer, a writer and optionally a disk destruction devise connected to a personal computer by a USB port cable. The computer can select files from its hard drive and place them in a folder for writing on a disk in the digital copying machine. The personal computer can also make copies of a disk in its disk drive or make copies of portions of the disk in its disk drive and add files from the computer hard drive or from memory. The digital copying machine can print on the disks to identify them. The digital copying machine has a robotic arm for removing disks from a stack and placing them in the writer, the printer or on a finished stack. Software in the personal computer can be programmed for the number of copies to be made and what is printed on the disks.

6 Claims, 4 Drawing Sheets

DIGITAL COPY MACHINE

BACKGROUND OF THE INVENTION

1. Field of the Invention

This invention relates to use of a personal computer to run a digital copying machine for copying, labeling and optionally destroying CDs and DVD's from files in the personal computer or on a disk in the personal computer using a USB 2.0 connector between the personal computer and the disk copying machine.

2. Description of the Related Art

It is common to have personal computers with a CD or DVD reader and a separate CD or DVD writer such that copies of the master CD or DVD can be made in the personal computer. The personal computer is efficient for making one or two copies of a master CD or DVD, however it is not suitable for making large numbers of copies and does not have an automatic feeder for the blank disks and an automatic stacker for the copied disks. Further the writers in a PC for CD's and DVD's generally do not have a printer for printing on the surface of the disks.

For making large numbers of copies of master disks stand alone CD and DVD copy machines are used. These machines use a master disk in a read drive to be copied and a plurality of write disk drives to make copies of the master disk. The CD or DVD copy machine may automatically load a disk into the write disk drives for making copies of the master and then automatically remove the copy and place it in a stack of copied disks. The CD or DVD copy machine may include a printer for printing on the copied disks to show what the content of the disk is. A PC may be used to read the master disk and transfer the data to the writers in the disk copying machine.

In the past the computer which contained the disk reader or the information to be transferred to the CD or DVD digital copying machine had to have special cabling and the digital copying machine needed special software and cards to run the digital copying machine. These special connections and cards increase the cost of the disk copying machines.

Making copies of disks one at a time in a personal computer is labor intensive and time consuming for making large numbers of copies.

Making copies of disks in currently available digital copying machines requires expensive specialized equipment for copying a master disk and is geared for large numbers of copies.

It is desirable to have a disk copying machine such that a personal computer can run the disk copying machine and for selecting portions of data stored on a hard drive or in memory in the computer or on portions of a disk, to make copies of the data without having to copy a master disk. It is further desired to be able to copy a master disk to one or more writer drives without special cabling or software cards in the digital copying machine. It is also desirable to use a standard USB 2.0 port and cable to connect a personal computer to a stand-alone digital copying machine to make copies of disks and to print on the disks.

One problem with digital copying machines is there is a robotic arm having a stepper motor for picking up disks and placing them in disk drives, printer drives and stacks of finished disks. The stepper motors are noisy and set up vibrations which can hit resonant frequencies on the digital copying machine. The digital copying machines are frequently weighted in various locations to dampen the vibrations and noise but this adds weight to the digital copying machine.

Another need is for destroying and certifying the destruction of disks containing private information or copyrighted works. A digital copying machine should be capable of placing a serial number electronically on the disk for identification and a disk destruction system should be able to read the serial number and record the destruction.

SUMMARY OF THE INVENTION

A personal computer allows the user to select information to be copied and stored on a disk. The original information can be copied from a master disk or it can be gathered from various files on a hard drive, from electronic memory or a disk and placed in a folder for writing on a disk.

The digital copying machine has a writer for writing information on a disk such as a CD or a DVD. The digital copying machine also has a printer for printing identifying information on the disk so that words and pictures on the disk indicate what is on the disk. A robotic arm is used to remove blank disks from a stack and place the blank disk in the writer, then in the printer and then into a finished stack.

A personal computer is programmed to run the disk copy machine since the computing power of a PC is a low cost means of controlling the disk copy machine. The computer is connected to the copying machine by a standard USB 2.0 port instead of having to have special cabling. The computer uses a standard ATAPI to communicate with the writer.

The robotic arm allows the making of multiple copies of disks without the labor required to individually stick each disk into a writing disk drive and then remove it. The personal computer remembers which files to write on the disk and controls the robotic arm to eliminate the labor of putting in and removing each disk from the writer and the printer.

A stepper motor for running the robotic arm in the digital copying machine can be run by the computer using variable speed pulsing to remove resonant frequency vibrations in the digital copying machine to reduce noise and vibrations and to increase the life of the digital copying machine.

The personal computer can also be used to place serial numbers on disks and read the serial number on disks. The personal computer can recognize defective disks and destroy the disks by instructing the robotic arm to deposit it into a disk destruction device optionally attached to the digital copying machine. The personal computer can also read the serial number on disks and certify their destruction by instructing the robotic arm to deposit it into a disk destruction device optionally attached to the digital copying machine.

OBJECTS OF THE INVENTION

It is an object of the invention to use a personal computer to run the digital copying machine.

It is an object of the invention to select files from a hard drive on a personal computer to make a folder of selected files for storage on a disk.

It is an object of the invention to select files from a hard drive, memory or other disks to make a file for storage on a disk.

It is an object of the invention to record a serial number on copies of disks.

It is an object of the invention to copy a master disk onto a blank disk.

It is an object of the invention to write to a blank disk and to print on a blank disk.

It is an object of the invention to destroy disks.

It is an object of the invention to record the serial numbers of destroyed disks.

It is an object of the invention to certify the destruction of disks.

It is an object of the invention to reduce the labor involved in writing to multiple disks.

It is an object of the invention to reduce the costs involved in writing to multiple disks.

It is an object of the invention to reduce the labor involved in printing on multiple disks.

It is an object of the invention to reduce the costs involved in printing on multiple disks.

It is an object of the invention to reduce the costs of digital copying machines by using a personal computer to run the programs for controlling the digital copying machine.

It is an object of the invention to connect a personal computer to a stand-alone digital disk copying machine by a standard USB 2.0 port and cable.

It is an object of the invention to reduce noise and vibration of the digital copying machine.

It is an object of the invention to provide a general user interface, which is easy to use for instructing the digital copying machine on what to write on the disks.

It is an object of the invention to provide a general user interface, which is easy to use for instructing the digital copying machine on how many copies to make.

It is an object of the invention to provide a general user interface, which is easy to use for instructing the digital copying machine on what to print on the disks.

It is an object of the invention to provide a disk destruction device for destroying and accounting for destroyed disks.

It is an object of the invention to lower to cost of digital copying machines.

It is an object of the invention to make it easy to run the digital copying machine.

It is an object of the invention to make it easy to select what to print on the disk.

It is an object of the invention to make a lightweight digital copying machine.

It is an object of the invention to increase the life of a digital copying machine.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
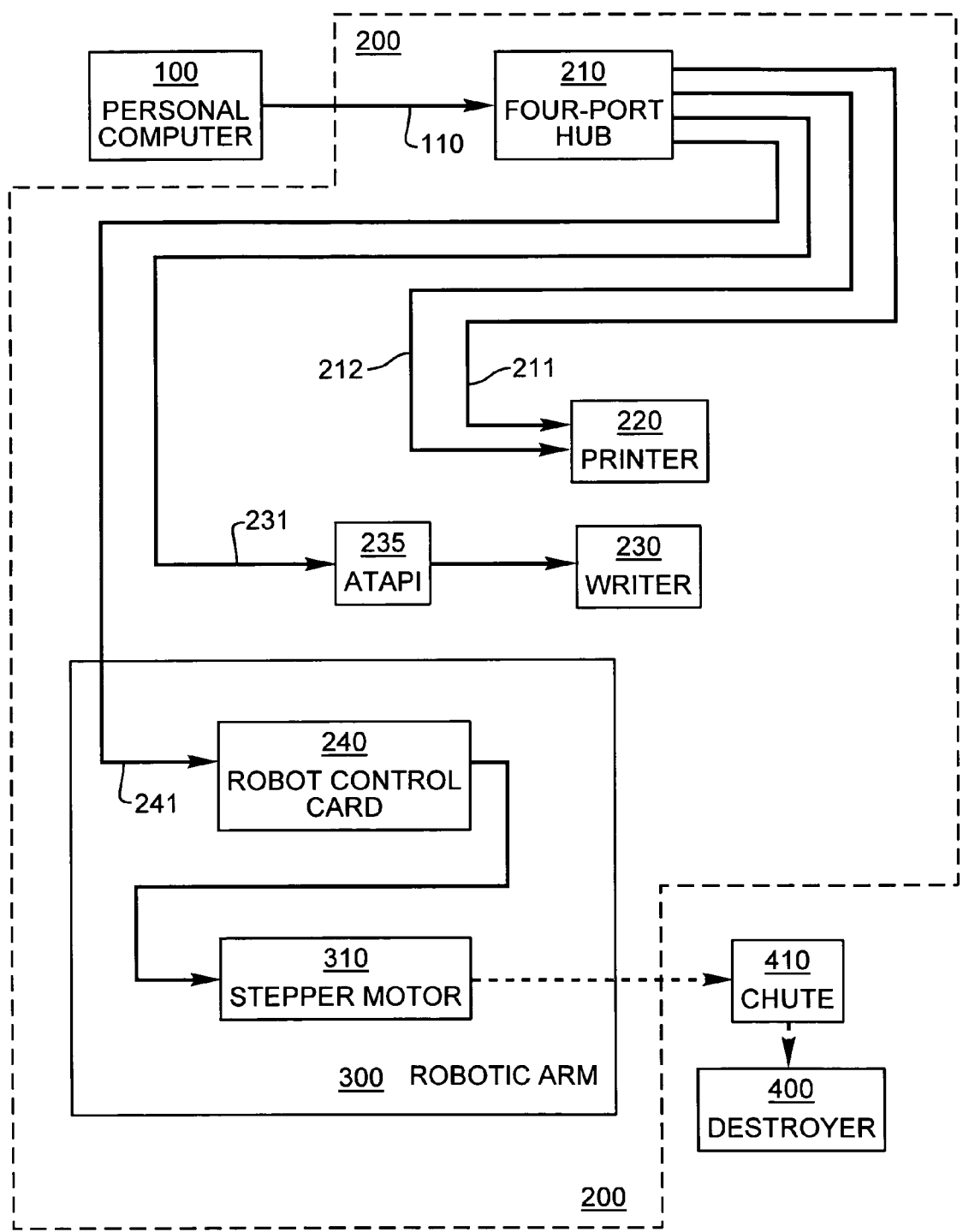
FIG. 1 is a schematic diagram of the digital copying machine connected to a personal computer.
Figure 2:
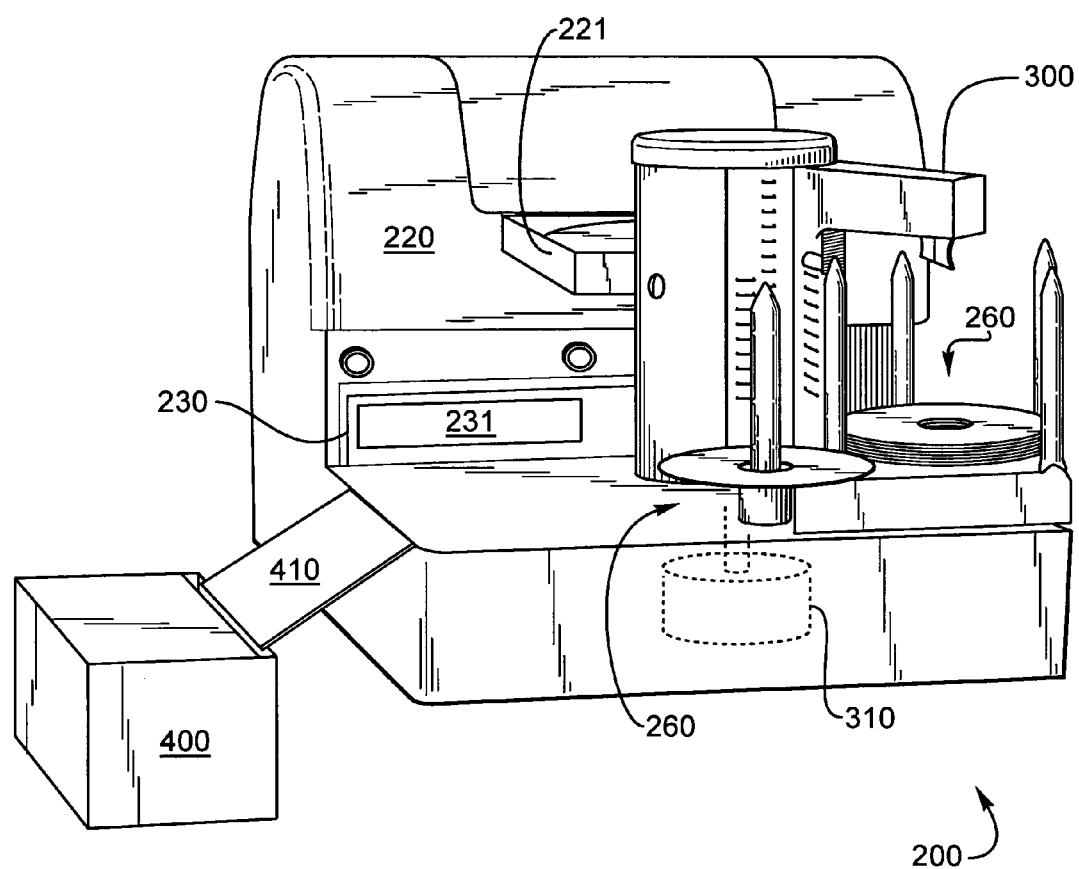
FIG. 2 is a perspective view of the digital copying machine.

The digital copying machine 200 is run by a computer 100 such as an IBM®, IBM® compatible personal computer or other types of computers. Using the computer 100 to run the digital copying machine 200 takes advantage of the low cost electronics in the personal computer 100 to run the components in the digital copying machine 200 rather than develop special cards and controllers for the components. The computer 100 uses an RS-232 serial cable 110 to connect to digital copying machine 200 at the four-port USB hub 210. There are four USB cables leaving the four-port USB hub 210. The first cable is a data cable 211 which goes to printer 220. The second cable 212 is the control USB to RS-232 adaptor from the four-port USB hub 210 to the printer 220. The third cable 231 is a USB from the four-point hub 210 to writer 230. The data is transmitted using ATAPI 235. The writer 230 can be virtually any CD or DVD writer and the writer contains a reader. The fourth cable 241 is a USB to RS232 that goes from the four-port USB hub 210 to the robotic control card 240, which is inside of and controls a programmable robotic arm 300.

In an alternative embodiment a disk destroyer 400 is attached to the digital copying machine 200. The disk destroyer 400 can have a mechanism for punching holes in the disk to destroy it. The disk destroyer 400 has a chute 410 for placing disks on. The disk then enters the disk destroying mechanism in the disk destroyer 400 and is destroyed. The disk destroying mechanism can be a device that places holes in the disk thus effectively destroying the information on the disk.

When a disk is to be destroyed the robotic arm 300 can place a disk to be destroyed in the reader/writer 230, which reads the serial number on the disk, records the serial number and sends the serial number information to the computer 100 certifying that the disk has been destroyed. The robotic arm then drops the disk on chute 410 which leads to the disk destroyer 400. The disk slides down the chute 410 into the disk destroyer 410 and is destroyed.

The digital copying machine 200 has a number of stations 260 for stacking disks which can be reached by the robotic arm 300. For example there may be two stations 260 for stacks of 60 blank disks ready for the digital copying machine 200 to make copies thereon. There may be a discard stack station for disks that are bad and a finished stack station for completed disks. To accommodate more disks one of the stations with disks to be copied can double as a finished disk stack after the blank disks are all removed from the blank disk stack.

The printer 220 and the writer 230 both have disk trays 221 and 231 respectively which can be extended to receive a disk from robot arm 300. When printer disk tray 221 is retracted into the printer 220 the printer can print on the disk. When the printer 220 is finished printing the printer disk tray 221 is extended and the robotic arm 300 can retrieve the disk. Similarly when the writer disk tray 231 is retracted into the writer 230 the writer can write on the disk. When the writer 230 is finished writing the writer disk tray 231 is extended and the robotic arm 300 can retrieve the disk.

With the above hardware a computer 100 can be programmed to create a folder having one or more files in it to act as a master disk for copying data onto disks in the digital copying machine 200. Generally a disk distributed with the digital copying machine 200 is loaded into the computer 100 to install the program to run the digital copying machine 200. With the installed program the computer 100 can gather the files from hard drives, memory, or other disks such as CD's and DVD's to create a master. The computer 100 can also be programmed to create files for printing on the disks in the digital copying machine 200.

Figure 3:
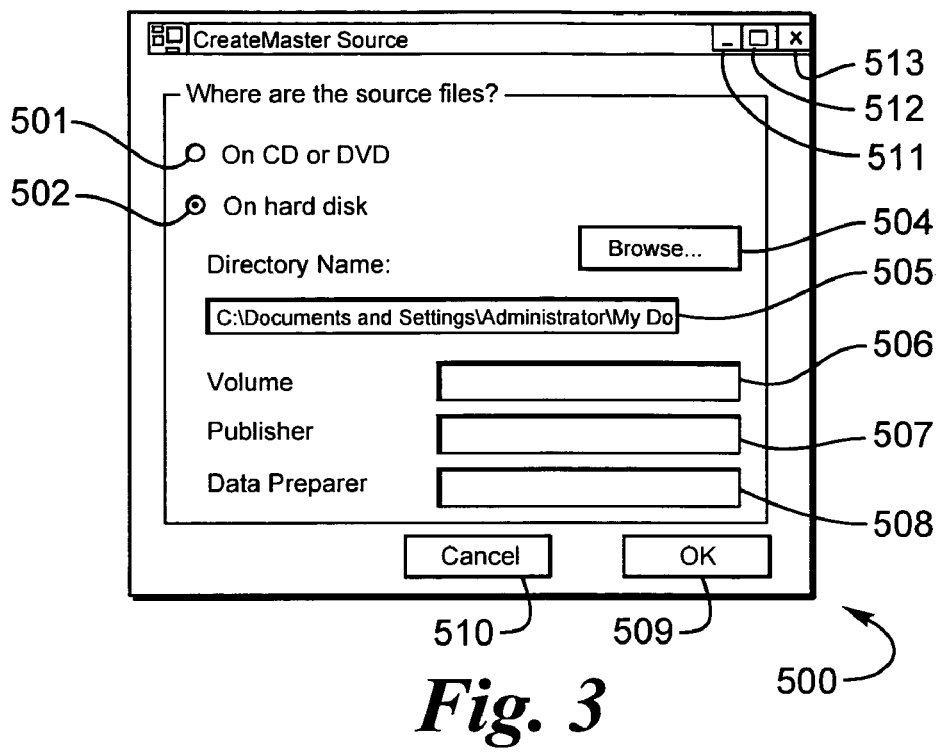
FIG. 3 shows the general user interface screen for creating a master file for writing on a disk.

To create a master, computer 100 can be programmed to have a first general user interface screen 500 as in FIG. 3 asking where the source files are such as on a CD or DVD, selection 501, or on a hard drive, selection 502. Next the user is asked the directory name of the file or folder. The user may browse the files by selecting the browse feature 504 to find the files or folders to be copied. The address of the files and folders is displayed in window 505. The volume window 506 allows the user to enter the name of the volume of the file or folder to be copied. The publisher window 507 allows the user to enter the publisher's name. The data preparer window 508 allows the user to enter the data preparer's name. The general user interface also has a cancel selection 510 to cancel the creation of the master and an O.K. selection 509 to approve the creation of the master. The general user interface also has a tool bar with a minimize selection 511, a restore selection 512, and a close selection 513.

The information for the master can be stored on the hard drive or alternatively it can be kept in memory.

The computer 100 can also be programmed to create print files for printing on the disks. The general user interface for creating the print files and folders is similar to the general user interface for creating a master.

Figure 4:
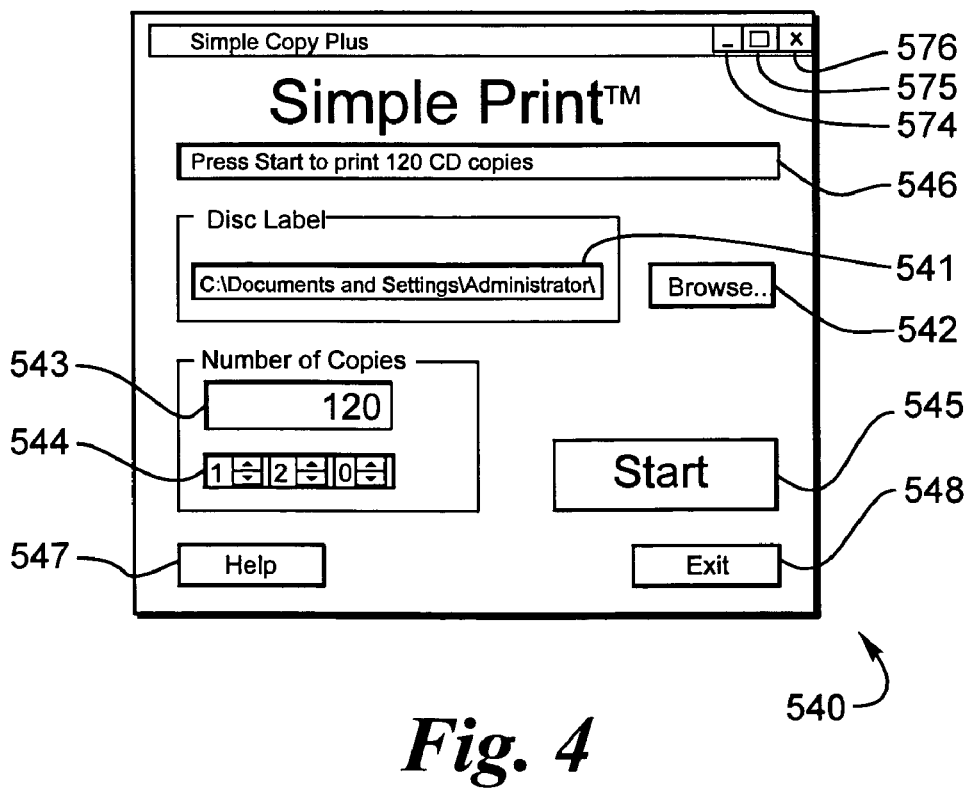
FIG. 4 shows the general user interface screen for use with finding a file for printing on the disk.

The digital copying machine 200 can be used solely to print on disks. The computer can be programmed with a general user interface 540 as shown in FIG. 4 wherein the disk label 541 file is called up to be printed. The file can be found with the aid of a browse button 542. When the correct file is located and selected the number of disks to be printed is entered in window 543, or with the aid of up and down arrows in the ones, tens, and hundreds columns of window 544. After the correct number of copies is entered the start icon 545 is clicked on to start the printing job. The instruction window 546 guides the user through the steps of the selection process telling the user which step is next in the process. There is preferably a help icon 547 on the screen, which can be clicked on for further aid in understanding how to use the printer 220. There is also an exit icon 548 for quitting the print set up and exiting the printer general user interface 540. The minimize, restore and close icons 574, 575 and 576 respectively are located in the upper right of the printer general user interface screen 540.

Figure 5:
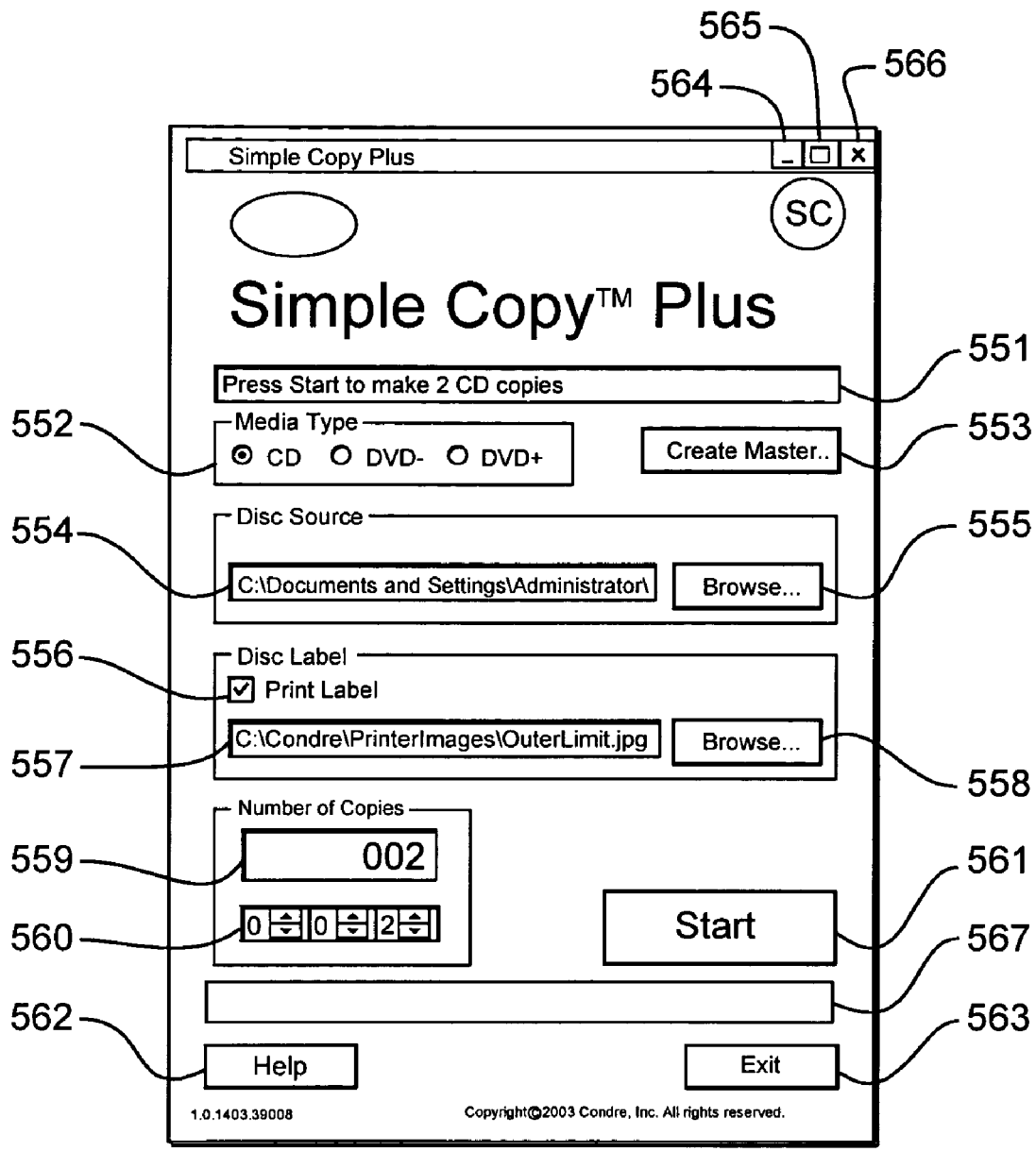
FIG. 5 shows the general user interface screen for use with finding the folders to create a file for writing and printing on the disk and for how many copies to make.

In general once the writer and printer files are stored in the computer 100 they can be selected to write and print such as by using the general user interface as shown in FIG. 5. The system makes it easy for the user to control the entire process.

As seen in FIG. 5 to create a master to be copied or to select a master to copy and select a label to be printed on the disk and the number of copies to be made can all be selected on one general user interface 550. The instruction window 551 guides the user through the programming steps. If a master is to be created the create master icon 553 is selected which will bring up the general user interface of FIG. 3 for creating a master to be copied onto a disk. If the master already exists then the media type icon 552 is used to select CD, DVD− or DVD+ for the kind of disk media desired for the copies. The computer 100 is programmed to run the writer 230 to write on that media type selected. The disc source window 554 is used to select the master file or folder, which is to be copied. The browse icon 555 can be used to help find the file or folder to be copied.

The user then decides if the digital copy machine is to print a label on the disks. If a label is to be printed on the disks then a check mark is placed in the print label box 556, and the user selects the file of the label to be printed by viewing the list of files in print label file window 557. The browse icon 558 can be used to help find and select the label to be printed on the disk.

The user then selects the number of copies to be made by typing the number in number of copies window 559 or using the up and down arrows in window 560 to select digits in the ones, tens and hundreds columns.

The general user interface in FIG. 5 has a help icon 562, an exit icon 563, a minimize icon 564 a restore icon 565 and a close icon 566 as was explained above in FIG. 3 and as is generally understood by users of WINDOWS® products.

After all selections are made the start icon 561 is selected and the computer 100 directs the writer disk tray 231 to eject and await the deposit of a disk. The robot arm 300 is directed to select the top disk in a disk stack 260 and place it in the open writer disk tray 231 which then is directed to close and the writer makes a copy of the master as composed on the computer 100. The computer 100 then opens the writer disk tray 231 and the robot arm 300 is directed to remove the disk containing the copy of the desired data. Computer 100 can now eject the printer disk tray 221 in printer 220 and then place the copied disk therein, close the printer disk tray 221 and print a label on the disk. The computer 100 then directs the printer disk tray 221 to eject and the robot arm 300 to retrieve the disk and place it in a finished stack. The progress bar 567 shows how much of the job the digital copy machine has finished as the production run continues.

If the digital copying machine 200 is only to use the writer 230 to make copies of disks the printer steps as listed above are skipped and the computer directs the robot to place the disks from the writer 230 into a finished stack.

Similarly if the digital copy machine 200 is only used to print labels on disks the writing step is skipped and the computer directs the robot to place the disks from the printer 220 in the finished stack.

There are many combinations of robot motions, which may be employed depending on the writing speed of the writer and the printing speed of the printer. For example if the writer is faster than the printer a written disc may be placed in an intermediate stack waiting for the printer to become available.

The software to control all the different functions—the printer 220, the writer 230, the robotics card 240, and all the robotics functions are located in the computer 100 and communicates all these instructions over the USB connection 110 to the digital copying machine 200 thus lowering the cost of making the digital copying machine.

The robotic arm 300 has a stepper motor 310. In order to reduce noise and vibrations of the stepper motor 310 and the digital copying machine 200 the computer 100 uses a variable pulse rate to the motor 310 such that resonance frequencies in the robot arm 300 and the digital coping machine are not reached making the robot arm 300 and the digital copying machine 200 run very quiet. If the pulse rate to the stepper motor 310 is constant it will set up as a resonance within the metal framework of the robot arm 300. A variable pulse rate to the stepper motor 310 significantly reduces the noise and vibration of the robot arm 300 and helps the digital copy machine run quieter with lower vibration levels. The pulse rate is programmed on the robotic control card 240. The pulse rate can be tuned to the digital copying machine 200 and the robot arm 300 to reduce noise and vibration resulting in a quieter longer lasting digital copying machine 200. Further the printer 220 and writer 230 do not experience as much vibration so they function more accurately. Mechanical resonance points can be avoided improving the quality of the digital copying machine 200.

The computer 100 can also be programmed to provide a serial number on each copied disk to identify it. When a disk is destroyed the serial number can be read and the disk can be certified as destroyed.

A disk destroyer 400 can be attached to the digital copying machine 200 such that a stack of disks can be destroyed by placing them in a disk stack 260. The computer 100 is programmed with a disk destruction program including a general user interface for directing the computer 100 to destroy a specified number of disks. The disks are placed in a stack 260 and the robotic arm 300 picks up the top disk in the stack and places it in the writer 230. The writer 230 has a reader in it for reading the serial number on the disk. The serial number is then stored in the computer 100 and the robot arm 300 then retrieves the disk from the writer 230 and places it on chute 410 on the disk destroyer 400. The disk destroyer 400 then places holes through the disk destroying it.

Obviously, many modifications and variations of the present invention are possible in light of the above teachings. It is therefore to be understood that, within the scope of the appended claims, the invention may be practiced otherwise than as specifically described.

What is claimed is:

1. A digital copying machine comprising,
   a personal computer connected to a UBS port hub in a digital copying machine for transmitting data from the computer,
   a robotic arm for picking up and dropping disks in desired locations, a control card in the robotic arm, the robotic arm connected to the hub by a USB cable, the robotic arm has a stepper motor driven by the computer using variable speed pulsing to eliminate resonant frequencies which create noise and vibrations in the robotic arm and the digital copying machine,
   a writer having a retractable disk tray for accepting disks placed therein by the robotic arm, retracting the disk into the writer, writing to the disk, and extending the retractable disk tray for disk pick up by the robotic arm, the writer connected to the hub by a control USB cable and a data USB cable,
   a printer having a retractable disk tray for accepting disks placed therein by the robotic arm, retracting the disk into the printer and printing on the disk, and extending the retractable disk tray for disk pick up by the robotic arm, the printer connected to the hub by a USB cable with signals sent by ATAPI,
   software on the computer for selecting what is to be written on the disc, and sending the data to the writer for writing on the disc,
   software on the computer for selecting what is to be printed on the disc, and sending the data to the printer for printing on the disc,
   software on the computer for selecting the number of discs to produce and controlling the robotic arm, the printer and the writer for producing the desired number of copies.

2. A digital copying machine as in claim 1 wherein,
   a disk destroyer attached to the digital copy machine for destroying disks placed therein by the robotic arm.

3. A digital copying machine as in claim 1 wherein,
   a general user interface program on the computer allows selection of files to create a master for copying from sources selected from the group consisting of the computer hard drive, the computer memory and a disk.

4. A digital copying machine as in claim 1 wherein,
   software on the computer selects a serial number for inclusion on the disc.

5. A digital copying machine as in claim 4 wherein,
   software on the computer reads the serial number for inclusion on the disc and documents destruction of the disc.

6. A digital copying machine as in claim 2 wherein,
   an angled ramp from the digital copying machine to the disk destroyer accepts the disc from the robotic arm such that it slides into the disc destroyer.

\* \* \* \* \*